(No Model.) 2 Sheets—Sheet 2.
W. L. FRUEN.
BICYCLE.
No. 479,757. Patented July 26, 1892.
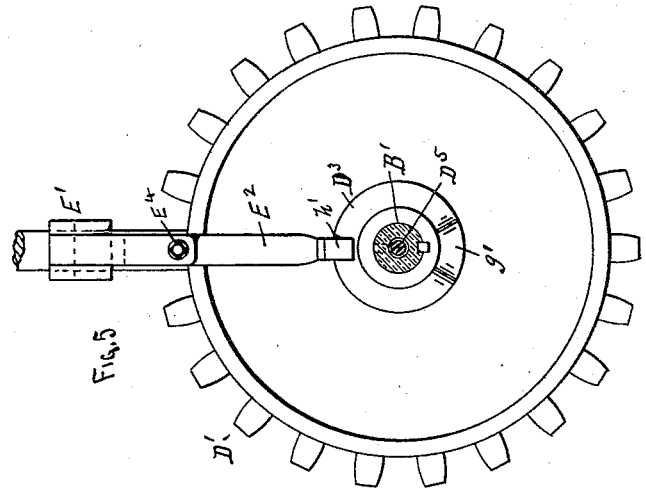
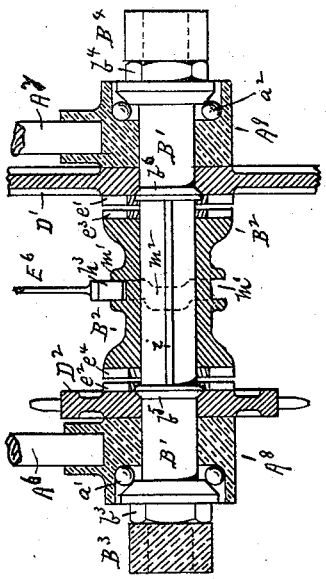
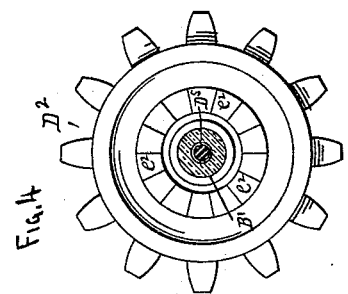
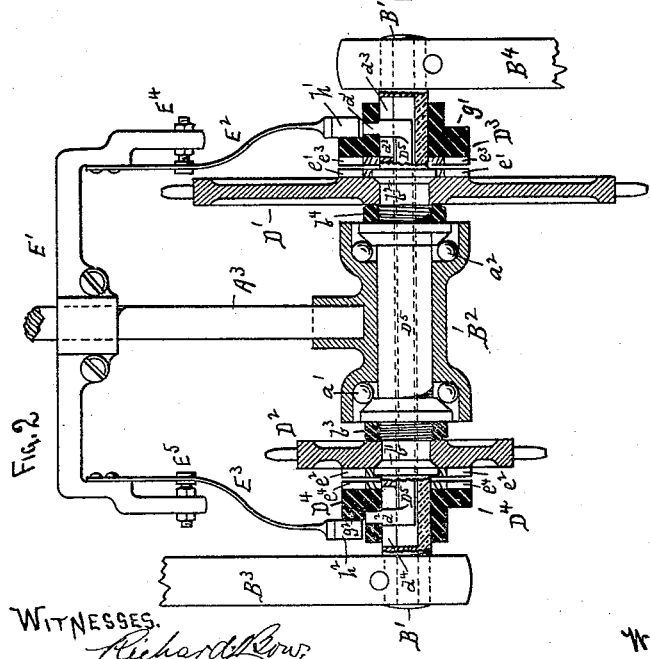
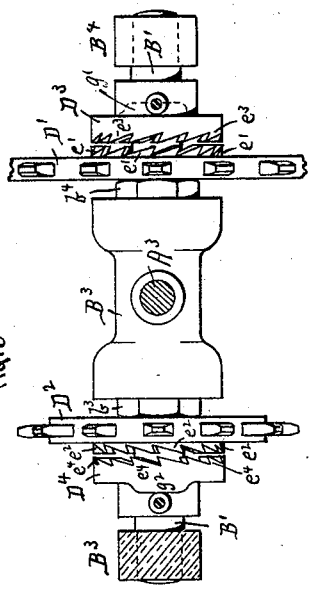
WITNESSES.
Richard Row
Fred H Pickles
Walter L. Fruen, INVENTOR, BY
Charles N. Woodward Atty

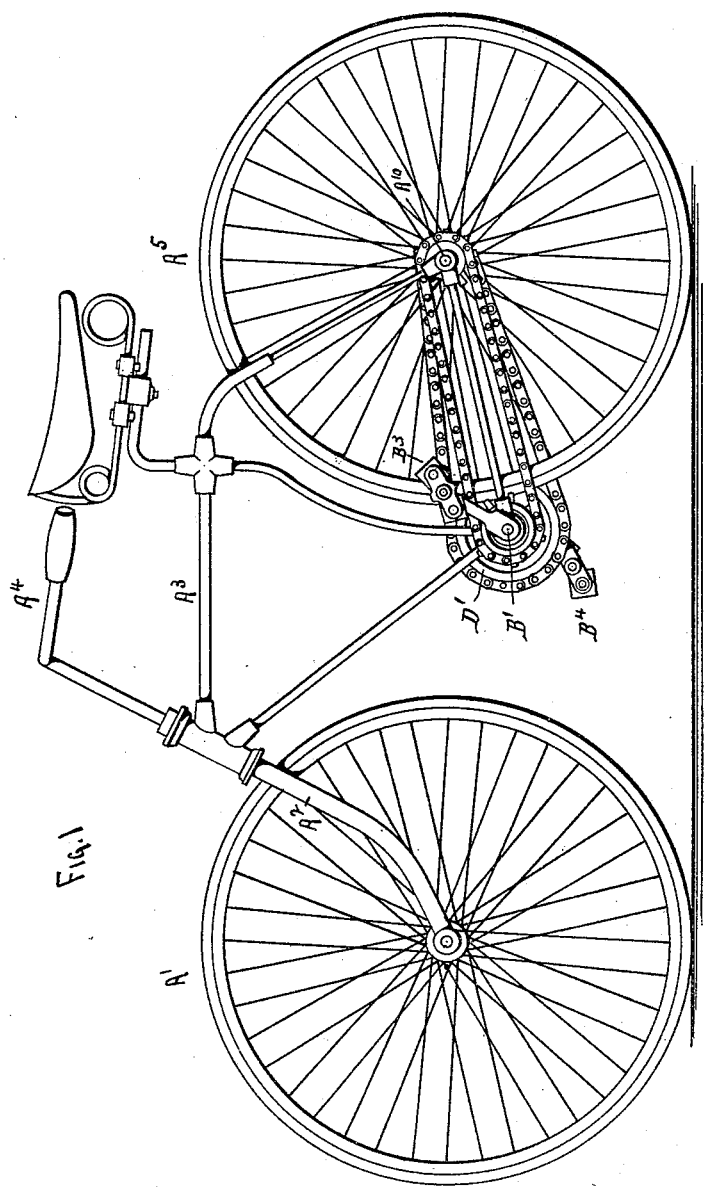

UNITED STATES PATENT OFFICE.

WALTER L. FRUEN, OF MINNEAPOLIS, MINNESOTA, ASSIGNOR OF ONE-THIRD TO WILLIAM H. FRUEN, OF SAME PLACE.

BICYCLE.

SPECIFICATION forming part of Letters Patent No. 479,757, dated July 26, 1892.

Application filed September 15, 1891. Serial No. 405,772. (No model.)

*To all whom it may concern:*

Be it known that I, WALTER L. FRUEN, a citizen of the United States, residing at Minneapolis, in the county of Hennepin and State of Minnesota, have invented certain new and useful Improvements in Bicycles, of which the following is a specification.

This invention relates to bicycles and similar vehicles; and it consists in the construction, combination, and arrangement of parts whereby a differential motion may be imparted to the traction-wheel from the treadle mechanism, as hereinafter shown and described, and specifically pointed out in the claims.

In the drawings, Figure 1 is a side elevation of a bicycle of the ordinary "Safety" form with my improvements attached thereto. Fig. 2 is an enlarged view in section through the treadle-shaft. Fig. 3 is a plan view of the parts shown in Fig. 2. Fig. 4 is a cross-section on the line X X of Fig. 2, looking inward toward the center of the mechanism. Fig. 5 is a similar view in section on the line Y Y of Fig. 2, looking inward toward the center of the mechanism. Fig. 6 is a view similar to Fig. 2, illustrating a modification in the construction to adapt the invention to other forms of bicycles.

This invention may be applied to any form of bicycle in which the motion is imparted by mechanism connecting a treadle-shaft with the axles of the traction-wheels; but for the purpose of illustration I have shown the invention applied to a well-known form of Safety bicycles, A' representing the forward traction-wheel, connected by swivel-frame A² to the main backbone-frame A³ and with the usual steering-levers A⁴.

A⁵ represents the rear traction-wheel supported in the frame A³, and B' represents the treadle-shaft supported in a sleeve B² in the frame A³ and having the foot-treadles B³ B⁴, attached to its ends in the usual manner. All these parts are of the usual construction and are generally common to vehicles of this class, the relative sizes and locations of the parts being varied somewhat with machines of the different manufacturers.

The sleeve B² is shown supported upon the treadle-shaft by ball-bearings $a'$ $a^2$ in the usual manner, and with the usual sprocket-wheel D', running loose upon the treadle-shaft instead of being fast thereon, as in the ordinary construction. In this construction I employ an additional smaller sprocket-wheel D², also loose upon the treadle-shaft outside the opposite end of the sleeve B³ from the wheel D' and both held from end-play by collars $b'$ $b^2$ or other means, and the ball-bearing nuts $b^3$ $b^4$. Upon the outer face of each of the hubs of the sprocket-wheels D' D² are formed radiating undercut ratchet-teeth $e'$ $e^2$, and sliding over the treadle-shaft outside the sprocket-wheels are two hubs or sleeves D³ D⁴, having undercut ratchet-teeth $e^3$ $e^4$, corresponding to and adapted to engage with the teeth $e'$ $e^2$ on the hubs of the sprocket-wheels. The sleeves D³ D⁴ are connected together by a rod D⁵, passing through the center of the treadle-shaft and with its ends $d'$ $d^2$ turned outward through slots $d^3$ $d^4$ in the treadle-shaft and connected into the sleeves D³ D⁴, so that while the sleeves are free to move along the shaft B' they will be turned with it by the ends $d'$ $d^2$ of the connecting-rod D⁵, as shown, which thus forms adjustable or movable connections between the parts. Formed upon the outer face of the sleeves D³ is a cam-surface $g'$, (see Figs. 3 and 5,) this cam-surface being opposite the side of the shaft on which the foot-treadle arm B⁴ is attached, while the sleeve B⁴ has a similar cam-surface $g^2$ on the opposite side of the shaft from the cam-surface $g'$ or next the other treadle-arm B³. This second cam-surface $g^2$ is shown in Fig. 2.

Supported by a hanger-frame E' upon one of the braces of the main frame A³ are two springs E² E³, projecting downward each side of the sleeves D³ D⁴ and each provided with an anti-friction roller $h'$ $h^2$, adapted to rest against the outer faces of the sleeves D³ D⁴, as shown. The rod D⁵ is of such a length that the teeth $e'$ $e^2$ of the sleeves D³ D⁴ will both be free from the teeth $e^3$ $e^4$ when held centrally, as in Fig. 2, while the springs E² E³ will be so adjusted as not to bear upon the sleeves D³ D⁴ when the treadles are held horizontally, so as to bring the cam-surfaces $g'$ $g^2$ out of contact with the rollers $h'$ $h^2$ on the springs. When thus held, the springs balance or counteract each other and hold the connected sleeves in their central position and out of engagement with the ratchet-teeth of the sprocket-wheels.

In Fig. 2 the sleeve $D^4$ is in a position for the spring $E^3$ to act upon it and throw its teeth $e^4$ into engagement with the teeth $e^2$ of the wheel $D^2$, this action also causing the sleeve $D^3$ to be moved farther away from the wheel $D'$ by the rod $D^5$ and causing it to remain inactive while the sleeve $D^4$ is in action. The springs $E^2$ $E^3$ are shown adapted to be adjusted at $E^4$ $E^5$, so as to keep them in their proper position with relation to the sleeves.

In Fig. 6 I have shown a view similar to Fig. 2, illustrating the modifications necessary to adapt the device to another form of bicycle, in which two braces $A^6$ and $A^7$ are used instead of one $A^3$, as in Fig. 2, and with the sprocket-wheels $D'$ $D^2$ arranged inside the braces. In this construction the sleeve $B^2$ is formed separate from the hubs $A^8$ $A^9$ of the braces $A^6$ $A^7$, and with the ball-bearings $a'$ $a^2$ in the outer ends of these hubs. The sprocket-wheels $D'$ $D^2$ are arranged to run loose upon the shaft and are held from end-play by collars $b^5$ $b^6$ and with the undercut ratchet-teeth $e'$ $e^2$, formed upon the inner faces of their hubs instead of on their outer faces, as in Fig. 2. The corresponding ratchet-teeth $e^3$ $e^4$ are formed upon the ends of the sleeve $B^2$, which is connected to the shaft $B'$ by a feather-key $i$, or by other similar suitable means, by which it is free to slide along the shaft but be turned with it. Formed around the center of the sleeve $B^2$ is a channel $m'$, having offsets $m^2$ opposite the sides of the shaft, from which the treadle-arms $B^3$ and $B^4$ project, in which channel an anti-friction roller $h^3$ on the lower end of a spring $E^6$ rests, as shown. The offsets $m^2$ correspond to and perform the same functions as the cam-surfaces $g'$ $g^2$ on the sleeves $D^3$ $D^4$, (shown in Fig. 2,) while the remaining portions of the channel $m'$ correspond to and perform the same functions as the outer surfaces of the sleeves $D^3$ $D^4$, as shown in Figs. 2, 3, and 5.

The sleeve $B^2$ when held in its central position, as in Fig. 6, will be entirely free from the sprocket-wheels, in the same manner and for the same purpose as the sleeves $D^3$ and $D^4$ are held centrally in the construction shown in Fig. 2—that is to say, when the treadle-arms are held horizontally one of the straight portions of the channels $m'$ will be uppermost or next to the spring $E^6$, and then when one of the treadles is held downward one of the offsets $m^2$ will be opposite the spring, which will cause the latter to move the sleeve in the opposite direction and connect the teeth $e'$ and $e^3$, or the teeth $e^4$ and $e^2$, as the case may be. By this simple arrangement the motion may be readily and quickly changed by the operator by manipulating the treadles and without the necessity for stopping the machine or changing his position, and without the necessity of removing his hands from the steering-lever or removing his feet from the treadles, and without the necessity for the employment of any extra levers, brakes, or clutch-actuating mechanism. The mechanism is thus entirely automatic in its action, and the operation is very simple and is as follows:

If it is desired to connect the smaller sprocket-wheel $D^2$ with the traction-wheel $A^5$, so as to reduce the motion and correspondingly increase the power, which is very desirable in running up grades, it is only necessary for the operator to hold the treadle-arm $B^4$, or the one opposite to the smaller wheel, downward, which will bring the cam-surface $g^2$ on the sleeve $D^4$ uppermost, or opposite the anti-friction roller $h^2$ on the spring $E^3$, and compress the latter or turn it to one side. The effect of this will be to cause the spring in its reaction to force the sleeve $D^4$ inward and connect the teeth $e^4$ on the sleeve with the teeth $e^2$ on the hub of the sprocket-wheel $D^2$ and at the same time throw the other sleeve $D^3$ by its connection with the sleeve $D^4$ by the rod $D^5$ outward away from the sprocket-wheel $D'$. The moment the teeth $e^4$ and $e^2$ are engaged the operator begins to use the treadles, the undercut form of the teeth causing the parts $D^4$ and $D^2$ to retain their engagement so long as the pressure is maintained upon the treadle by the operator, and thereby counteracting the influence of the opposite spring $E^2$, which is held outward and somewhat under compression by the other sleeve $D^3$ and whose tendency is to disconnect the parts $D^2$ and $D^4$. The connection between the parts $D^2$ and $D^4$ is maintained without perceptible effort on the part of the operator because of this undercut form of the ratchet-teeth. When it is required to change the motion to the larger sprocket-wheel $D'$, it is only necessary for the operator to stop the motion of the treadles and hold the treadle-arm $B^3$ downward, when the cam-surface $g'$ on the sleeve $D^3$ will be held uppermost or opposite the anti-friction roller $h'$ on the spring $E^2$, which will cause the latter to move the sleeve $D^3$ along the shaft $B'$ and engage the teeth $e^3$ with the teeth $e'$ on the sprocket-wheel $D'$, and thus connect it with the shaft, the other sleeve $D^4$ in the meantime being thrown out of engagement with the sprocket-wheel $D^2$, and thence running as an idler with the shaft, while the sprocket-wheel $D^2$ runs likewise as an idler from the axle $A^{10}$.

The action of the sleeve $B^2$ in the construction shown in Fig. 6 is precisely the same as that of the sleeves $D^3$ and $D^4$ in Fig. 2, as before described.

The rod $D^5$ may be arranged in a slot in the shaft $B'$ instead of running through a hole throught the shaft, as shown, or arranged in any other manner that will accomplish the same results.

Having thus described my invention, what I claim as new is—

1. In velocipedes and similar vehicles, a shaft having oppositely-connected pedals, a traction-wheel, two independent sets of gearing connecting said pedal-shaft with the axle of said traction-wheel, and two clutches connected together and adapted to be engaged with and disengaged from said gearing by the act of holding the pedals in different positions.

2. In velocipedes and similar vehicles, a shaft having oppositely-connected pedals, a traction-wheel having two chain-wheels upon its axle, two chain-wheels loose upon said pedal-shaft and with clutch members upon or connected thereto and connected to the chain-wheels upon said axle by chains, and two clutch members connected together and adapted to be engaged with or disengaged from either of the clutch members of said chain-wheels by holding the pedal-shaft in different positions.

3. In velocipedes and similar vehicles, a shaft having oppositely-connected pedals, a traction-wheel having two chain-wheels upon its axle, two chain-wheels loose upon said pedal-shaft and with clutch members upon or connected thereto and connected to the chain-wheels upon said axle by chains, and two clutch members connected together and adapted to be engaged with or disengaged from either of the clutch members of said chain-wheels by holding the pedal-shaft in different positions, the teeth of said clutch members being undercut in opposite relations to cause them to retain their engaged relations, substantially as and for the purpose set forth.

In testimony whereof I have hereunto set my hand in the presence of two subscribing witnesses.

WALTER L. FRUEN.

Witnesses:
WM. FRUEN,
C. N. WOODWARD,